United States Patent [19]

Barrus et al.

[11] Patent Number: 4,498,793
[45] Date of Patent: Feb. 12, 1985

[54] PRINTER SHUTTLE DRIVE HAVING CASTERED CAM FOLLOWERS

[75] Inventors: Gordon B. Barrus, San Juan Capistrano; Leo J. Emenaker, El Segundo; Glen R. Radke, Westminster; Norman E. Farb, Villa Park; Gerold Holzer, Costa Mesa, all of Calif.

[73] Assignee: Printronix, Inc., Irvine, Calif.

[21] Appl. No.: 493,818

[22] Filed: May 12, 1983

[51] Int. Cl.³ .............................................. B41J 25/28
[52] U.S. Cl. .................................... 400/320; 74/569; 101/93.16; 400/323
[58] Field of Search ...................... 400/320, 323, 372; 101/93.15, 93.16; 74/569

[56] References Cited

U.S. PATENT DOCUMENTS

| | | | |
|---|---|---|---|
| 774,496 | 11/1904 | Rivett | 74/569 |
| 2,007,217 | 7/1935 | Rose | 74/569 |
| 2,404,231 | 7/1946 | Harper | 74/569 |
| 2,567,735 | 9/1951 | Scott | 74/569 |
| 2,592,536 | 4/1952 | Buckendale | 74/569 |
| 3,561,288 | 2/1971 | Mishra | 74/569 |
| 3,941,051 | 3/1976 | Barrus et al. | 400/322 |
| 4,173,954 | 11/1979 | Speckhardt | 74/569 |

Primary Examiner—Edgar S. Burr
Assistant Examiner—David A. Wiecking
Attorney, Agent, or Firm—Fraser and Bogucki

[57] ABSTRACT

In a printer in which a shuttle and a counterbalancing mass are driven in opposing reciprocating fashion by a rotating, generally oval-shaped cam, the cam followers which couple the shuttle and the counterbalancing mass to the cam are castered to prevent skewing of the cam followers relative to the cam. Each of the cam followers is disposed between and rotatably mounted on a pair of opposite arms extending outwardly from a generally planar base of a castered yoke assembly, the planar base being pivotally coupled to a supporting member therefor which is either coupled to the shuttle or forms a part of the counterbalancing mass. In a first embodiment the pair of opposite arms extend from the planar base toward the cam so as to dispose the cam follower between the pivotal mount of the yoke assembly and the cam. In a second embodiment the pair of opposite arms extend from the planar base in a direction away from the cam so as to dispose the pivot point of the yoke assembly between the axis of rotation of the cam follower and the cam.

10 Claims, 8 Drawing Figures

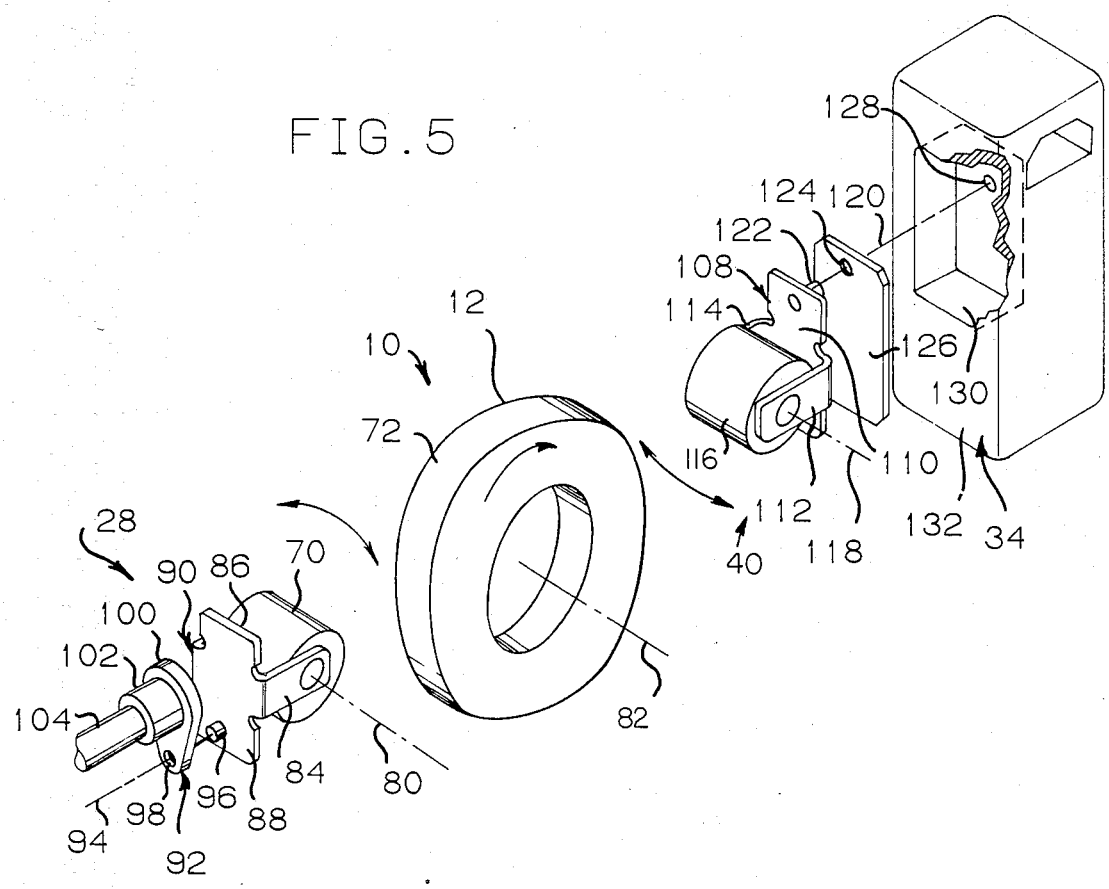
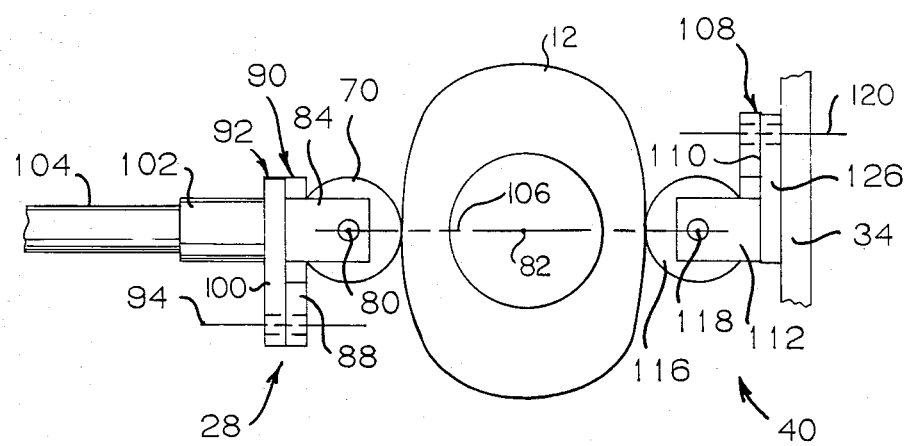

PRINTER SHUTTLE DRIVE HAVING CASTERED CAM FOLLOWERS

BACKGROUND OF THE INVENTION

1. Field of the Invention

The present invention relates to printer shuttle drives, and more particularly to printer shuttle drives in which a cam is employed to drive the shuttle in reciprocating fashion.

2. History of the Prior Art

It is known to drive a shuttle within a printer using a rotating cam. An example of a dot matrix line printer in which a hammer bank-carrying shuttle is driven in reciprocating fashion by a generally oval-shaped cam is provided by U.S. Pat. No. 3,941,051 of Barrus et al. In the printer shown in the Barrus et al patent the shuttle which is mounted so as to be capable of undergoing linear motion is coupled to the rotating cam by a rotatable, generally cylindrical cam follower. As the generally oval-shaped cam rotates, the cam follower which bears on the outer surface of the cam under spring pressure moves the attached shuttle back and forth along its linear path of travel in reciprocating fashion. Simultaneously, a counterbalancing mass which is also driven by the rotating cam is caused to undergo reciprocating motion in an opposite sense from the shuttle so as to counterbalance the reciprocating shuttle and thereby minimize or eliminate vibration or other unwanted motion which might otherwise result.

In cam shuttle drives of the type described in previously referred to U.S. Pat. No. 3,941,051 of Barrus et al, the cam follower must be aligned with the cam so that the axis of rotation of the cam follower is parallel or nearly parallel with the axis of rotation of the cam. If the cam follower becomes skewed such that the axis of rotation thereof is no longer generally parallel with the axis of rotation of the cam, a side thrust on the cam follower assembly results. The cam follower assembly which is typically made so as to be capable of withstanding substantial longitudinal loads on the order of 130 pounds or greater is usually not capable of withstanding much side thrust. The side thrust which results from a skewed condition of the cam follower relative to the cam may result in overheating, eventual scoring of the camming surfaces and even eventual failure of the cam or the follower assembly.

Careful adjustment of the shuttle mount so as to properly align the cam follower with the cam will usually minimize if not eliminate harmful side thrusts and the problems associated therewith. However, even where careful adjustment is periodically made, alignment can change for various reasons, particularly with prolonged use of the printer. This results in the possibility of damage if misalignment occurs and persists.

Accordingly, it would be desirable to provide a cam follower assembly for a cam shuttle drive which is essentially self-aligning so as to greatly minimize or eliminate unwanted side thrusts. It would furthermore be desirable to provide a cam drive arrangement in which the cam follower assembly employed to drive a counterbalancing mass from the same common cam that drives the shuttle is also self-aligning in nature.

BRIEF DESCRIPTION OF THE INVENTION

Printer shuttle drives in accordance with the invention drive the shuttle from a rotating cam using a cam follower assembly which is castered or pivoted so as to be self-aligning with respect to the cam. A cam follower is rotatably mounted on a yoke assembly having a generally planar base which is pivotally coupled to a mounting member mounted on a shaft of the shuttle. A counterbalancing mass for the printer can be driven by the same cam in self-aligning fashion using a similar yoke assembly inverted in position to compensate for the location of the cam follower for the counterbalancing mass on the opposite side of the cam from the shuttle driving cam follower.

In one embodiment of a castered cam follower assembly in accordance with the invention, a cam follower is disposed between and rotatably mounted on a pair of opposite arms extending outwardly from a generally planar base of the yoke assembly so as to dispose the cam follower between the planar base of the yoke assembly and the cam. The planar base of the yoke assembly is pivotally coupled to a generally planar base of a mounting member for rotation about an axis generally perpendicular to the axis of rotation of the cam follower. The planar base of the mounting member is secured to a generally cylindrical collar mounted on the end of a shaft extending outwardly from the shuttle. A yoke assembly of identical configuration but inverted in position may be stationed on the opposite side of the cam so as to drive a counterbalancing mass in self-aligning fashion. This second yoke assembly has the planar base thereof pivotally coupled to the counterbalancing mass such that the yoke assembly is pivotable about an axis generally perpendicular to the axis of rotation of the cam follower mounted thereon. The pair of opposite arms of this second yoke assembly also extend outwardly from the planar base in a direction toward the cam so as to dispose the cam follower mounted thereon between the cam and the planar base.

In a second embodiment according to the invention each cam follower is rotatably mounted by a yoke assembly which also includes a pair of opposite arms emanating from a planar base and rotatably mounting the cam follower, with the planar base being pivotally coupled to the mounting member. However, the pair of opposite arms extend from the planar base in a direction away from the cam and toward the mounting member so as to dispose the cam follower partially within the mounting member such that the pivot point of the yoke assembly lies between the axis of rotation of the cam follower and the cam. The mounting member which includes a planar base to which the planar base of the yoke assembly is pivotally coupled and a collar mounted on the end of the shaft extending from the shuttle also includes a hollow shell of partially cylindrical configuration which extends between the collar and the planar portion and receives the pair of opposite arms of the yoke assembly and a substantial portion of the cam follower. As in the case of the first embodiment described above, a yoke assembly of identical configuration but inverted in position may be stationed on the opposite side of the cam so as to simultaneously drive a counterbalancing mass. The planar base of this second yoke assembly is pivotally coupled to the counterbalancing mass, again with the pivot point being disposed between the axis of rotation of the cam follower and the cam.

BRIEF DESCRIPTION OF THE DRAWINGS

The foregoing and other objects, features and advantages of the invention will be apparent from the following more particular description of preferred embodiments of the invention, as illustrated in the accompanying drawings, in which:

FIG. 5 is a perspective, exploded view of a first embodiment of a printer shuttle drive in accordance with the invention;

FIG. 6 is a side view of the printer shuttle drive of FIG. 5;

DETAILED DESCRIPTION

Figure 1:
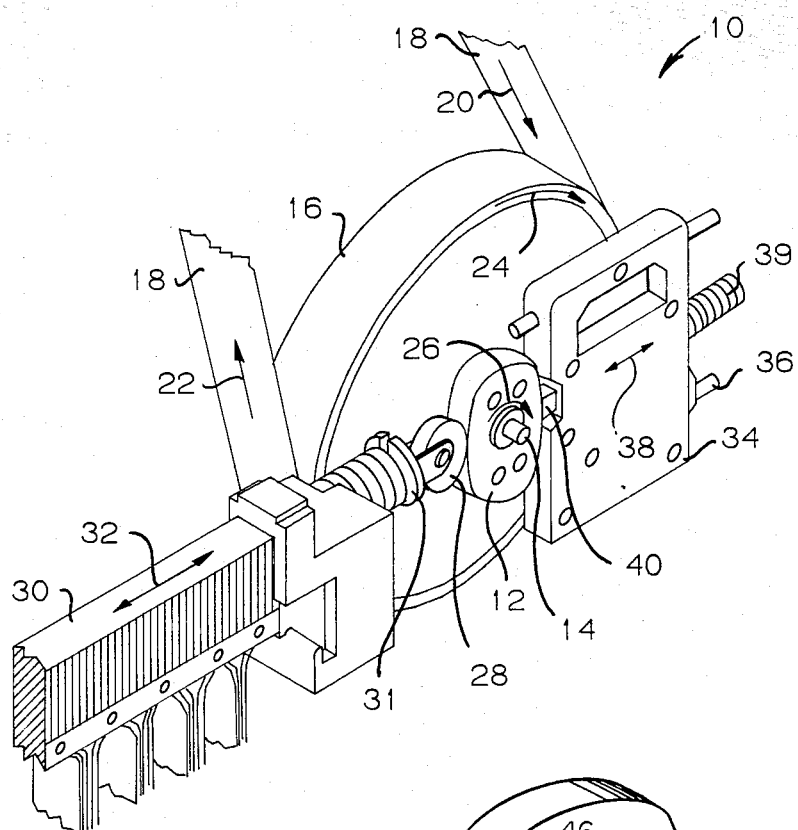
FIG. 1 is a perspective view of a printer shuttle drive having castered cam followers in accordance with the invention.

FIG. 1 depicts a printer shuttle drive 10 having castered cam followers in accordance with the invention. The drive 10 includes a generally oval-shaped cam 12 which is coupled via a shaft 14 to a pulley 16 driven by a belt 18. The belt 18 moves in the direction shown by arrows 20 and 22 to rotate the pulley 16 in a direction shown by an arrow 24. This rotates the cam 12 in a direction shown by an arrow 26.

The cam 12 is engaged on one side thereof by a castered cam follower assembly 28 mounted on a shuttle 30 and forced against the cam 12 by a spring 31. The shuttle 30 which can assume a configuration similar to that shown in previously referred to U.S. Pat. No. 3,941,051 of Barrus et al is mounted so as to undergo linear movement. The castered cam follower assembly 28 responds to rotation of the cam 12 by reciprocating the shuttle 30 as shown by an arrow 32.

Simultaneously with reciprocation of the shuttle 30, a counterbalancing mass 34 of generally rectangular configuration is reciprocated back and forth on a shaft 36 on which the mass 34 is mounted as shown by an arrow 38. The cam 12 drives the counterbalancing mass 34 against the resistance of a spring 39 via a castered cam follower assembly 40 which is mounted within the counterbalancing mass 34 and which contacts the opposite side of the cam 12 from the shuttle driving castered cam follower assembly 28.

Figure 2:
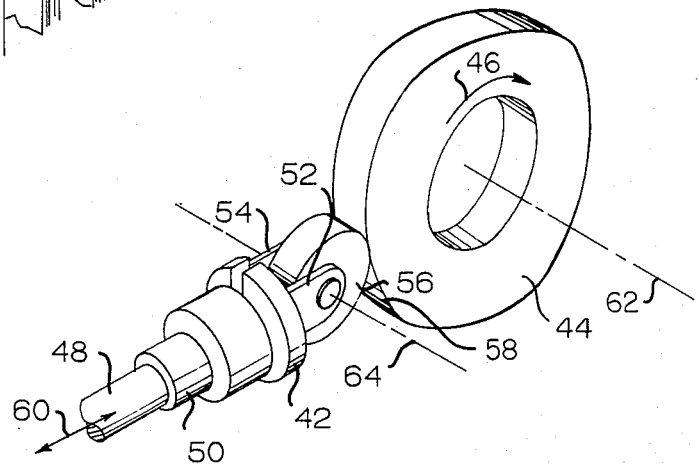
FIG. 2 is a perspective view of a conventional cam follower assembly together with an associated cam.

The castered cam follower assemblies 28 and 40 are shown in detail in two different embodiments thereof in FIGS. 5-8. The advantages of the assemblies 28 and 40 can be better appreciated by first considering a conventional non-castered cam follower assembly 42 which is shown in FIG. 2 in conjunction with a cam 44 of similar configuration to the cam 12. The cam 44 rotates in a direction shown by an arrow 46 so as to drive a shuttle (not shown in FIG. 2) via a shuttle shaft 48 to which the non-castered cam follower assembly 42 is coupled. The non-castered cam follower assembly 42 includes a base 50 mounted on the shuttle shaft 48 and having a pair of opposite arms 52 and 54 extending outwardly therefrom opposite the shuttle shaft 48. The arms 52 and 54 rotatably mount a generally cylindrical cam follower 56.

Figure 3:
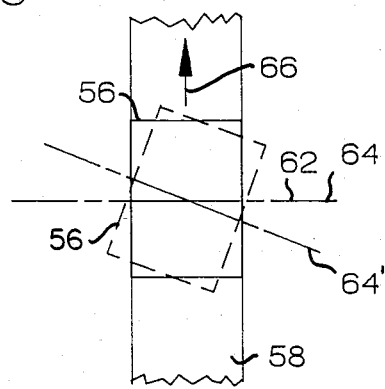
FIG. 3 is a diagrammatic illustration of the nature of a skewing problem in the alignment of a cam follower relative to a cam.

As the cam 44 rotates in the direction shown by the arrow 46, the cam follower 56 rotates along an outer camming surface 58 of the cam 44, resulting in reciprocating motion of the base 50 and the shuttle shaft 48 as shown by an arrow 60. The cam 44 rotates about a central axis 62 thereof. The cam follower 56 rotates about a central axis 64 thereof. The cam follower 56 is aligned with the cam 44 for free rolling about the outer camming surface 58 thereof when the central axes 62 and 64 are parallel or nearly parallel to each other. This condition is depicted in FIG. 3 where the position of the cam follower 56 is shown in solid outline and the axes 62 and 64 are shown to be parallel so as to coincide in that particular illustration. The outer camming surface 58 moves in an upward direction as shown by an arrow 66.

During operation of the printer shuttle drive 10 the cam follower 56 can become skewed relative to the cam 44. This can occur for a variety of reasons including failure to align the shuttle relative to the cam. In the skewed condition which is shown in exaggerated fashion in dotted outline in FIG. 3, the central axis 64 of the cam follower 56 is no longer parallel with the central axis 62 of the cam 44 but instead assumes a position 64′ so as to form an angle therewith. The cam follower 56 assumes a position as shown by a dotted outline in FIG. 3. If the skewed condition persists for very long excessive friction may begin to build up between the cam follower 56 and the cam 44 and internally in the cam follower 56. This typically results in overheating of the cam follower 56 and the cam 44 and the surrounding parts, eventual scoring or uneven wear of the camming surface 58 or the outer surface of the cam follower 56 and in some cases eventual failure of the parts.

Figure 4:
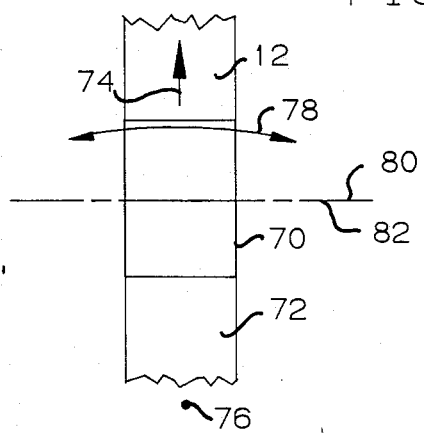
FIG. 4 is diagrammatic illustration of the self-aligning feature of a castered cam follower in accordance with the invention.

The castered cam follower assemblies 28 and 40 shown in FIG. 1 maintain the cam followers in alignment with the cam as illustrated in FIG. 4. FIG. 4 depicts a cam follower 70 within the castered cam follower assembly 28 in relation to the cam 12. The cam 12 has an outer camming surface 72 which moves in an upward direction as shown by an arrow 74. As described hereafter the castered cam follower assembly 28 has a yoke assembly which mounts the cam follower 70 and which is pivotable about an axis 76 such that the cam follower 70 is movable in an arc shown by an arrow 78. The resulting arrangement shown in FIG. 4 is self-aligning such that a central axis 80 of the cam follower 70 remains substantially parallel to a central axis 82 of the cam 12. As the camming surface 72 continues to move in the direction shown by the arrow 74 the pivotable yoke assembly which mounts the cam follower 70 pivots about the axis 76 as necessary so as to maintain the central axes 80 and 82 generally parallel with each other.

FIG. 5 and 6 depict a first embodiment of the printer shuttle drive 10. In the embodiment of FIGS. 5 and 6 the cam follower 70 of the castered cam follower assembly 28 is rotatably mounted between a pair of opposite arms 84 and 86 which extend outwardly from a generally planar base 88 forming a yoke assembly 90 together with the arms 84 and 86. As previously described in connection with FIG. 4 the cam follower 70 is rotatable about the central axis 80 thereof and the cam 12 is rotatable about the central axis 82 thereof.

The yoke assembly 90 is castered such that it is rotatable relative to a mounting member 92 along a pivot axis 94. This is accomplished by means of a pin 96 which is mounted on the planar base 88 of the yoke assembly 90 and which is rotatably received within a mating aperture 98 within a planar base 100 of the mounting member 92. The planar base 100 is coupled to a hollow, generally cylindrical collar 102 which in turn is mounted on a shuttle shaft 104. The shuttle shaft 104 is coupled to the shuttle 30 shown in FIG. 1.

It will be seen that the pivot axis 94 is generally perpendicular to both the central axis 80 of the cam follower 70 and the central axis 82 of the cam 12. Also, the pivot axis 94 lies on one side of a common plane which includes the central axes 80 and 82. The common plane 106 is represented by a dotted line in FIG. 6.

The castered cam follower assembly 40 which is used to drive the counterbalancing mass 34 in reciprocating fashion includes a yoke assembly 108 comprised of a generally planar base 110 having a pair of opposite arms 112 and 114 extending outwardly from the base 110 and pivotally mounting a cam follower 116 about a central axis 118. The planar base 110 is pivotally coupled to the counterbalancing mass 34 along a pivot axis 120. A pin 122 extending outwardly from the planar base 110 extends through an aperture 124 in a relatively thin, generally planar wear plate 126 and into a mating aperture 128 within the counterbalancing mass 34. The wear plate 126 and a portion of the yoke assembly 108 and included cam follower 116 reside within a recess 130 in a front edge 132 of the counterbalancing mass 34. The wear plate 126 which may be made of brass, steel or other appropriate material provides a bearing surface for the planar base 110 of the yoke assembly 108 which is disposed adjacent and rotatable relative to the wear plate 126.

It will be seen that the castered cam follower assembly 40 is of like configuration to the castered cam follower assembly 28 except that it is inverted and disposed on the opposite side of the cam 12 from the castered cam follower assembly 28. Consequently the pivot axis 120 is generally parallel to the pivot axis 94 but is disposed on the opposite side of the common plane 106 from the pivot axis 94. The central axis 118 of the cam follower 116 lies within the common plane 106 together with the central axis 80 of the cam follower 70 and the central axis 82 of the cam 12. The inverted positioning of the castered cam follower assembly 40 is because of the direction of movement of the portion of the camming surface 72 of the cam 12 which is adjacent thereto. Thus, the pivot axis 94 is positioned "upstream" from the central axis 80 of the cam follower 70 with reference to the direction of motion of the camming surface 72 of the cam 12. Likewise, the pivot axis 120 is positioned "upstream" from the central axis 118 of the cam follower 116 when referenced to the motion of the camming surface 72 of the cam 12. This positions the cam followers 70 and 116 in a trailing relationship so that they can self-align with the cam 12.

Figure 7:
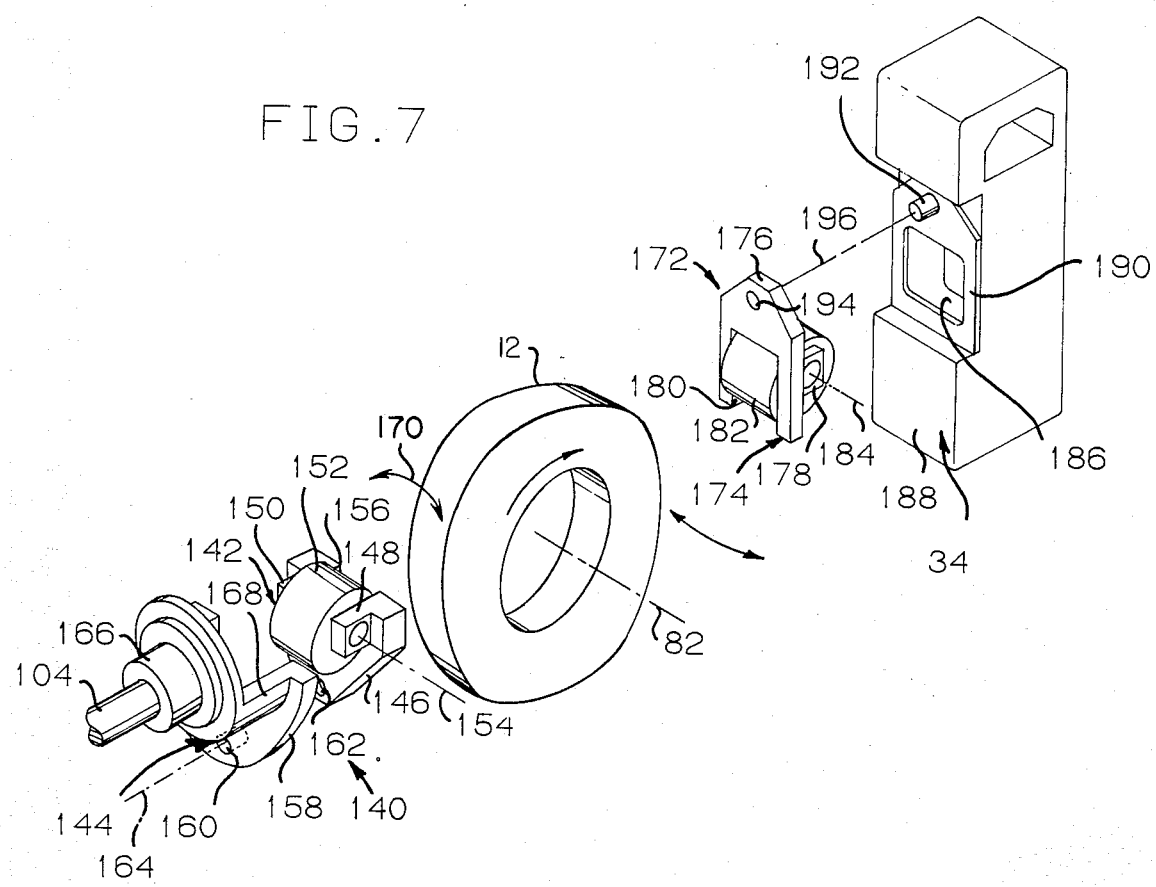
FIG. 7 is a perspective, exploded view of a second embodiment of a printer shuttle drive in accordance with the invention.
Figure 8:
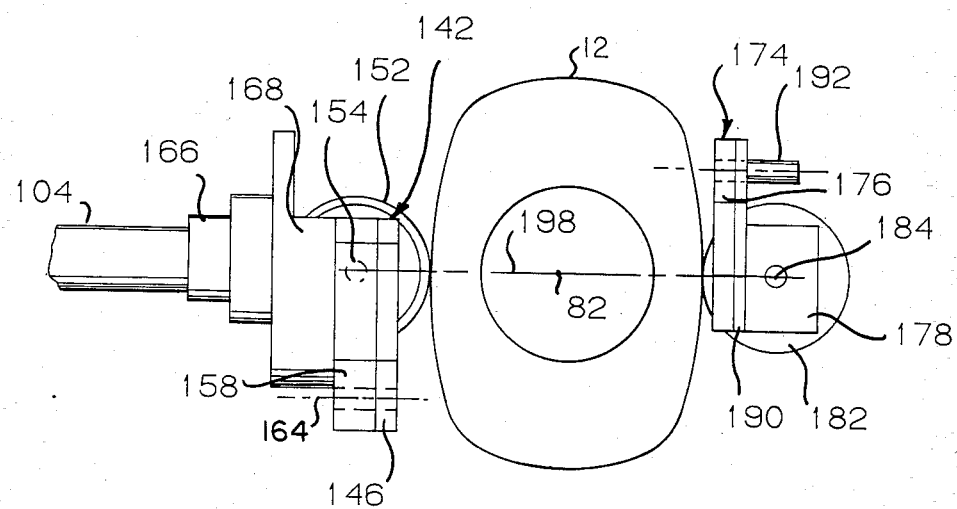
FIG. 8 is a side view of the printer shuttle drive of FIG. 7.

In the embodiment shown in FIGS. 5 and 6, the arms 84 and 86 of the yoke assembly 90 extend in a direction away from the base member 92 and toward the cam 12 so as to dispose the cam follower 70 such that the central axis 80 thereof is disposed between the cam 12 and the point at which the planar base 88 of the yoke assembly 90 pivots relative to the planar base 100 of the mounting member 92. Likewise, the arms 112 and 114 of the yoke assembly 108 extend in a direction away from the counterbalancing mass 34 and toward the cam 12 so as to dispose the cam follower 116 such that the central axis 118 thereof lies between the cam 12 and the point at which the planar base 110 of the yoke assembly 108 pivots relative to the wear plate 126 and the counterbalancing mass 34. This tends to place the arms 84 and 86 of the yoke assembly 90 as well as the arms 112 and 114 of the yoke assembly 108 in compression. For certain applications of the printer shuttle drive 10 such resulting compression may be undesirable, in which event a second embodiment depicted in FIGS. 7 and 8 is preferred. As will be seen from the description to follow the particular embodiment of FIGS. 7 and 8 places the pivot point between the central axes of the cam followers and the cam.

In the embodiment of FIGS. 7 and 8 the shuttle 30 is driven via the attached shuttle shaft 104 thereof by a castered cam follower assembly 140 which includes a yoke assembly 142 and a mounting member 144. The yoke assembly 142 includes a generally planar base 146 and a pair of opposite arms 148 and 150 extending outwardly therefrom in a direction away from the cam 12 so as to mount a cam follower 152 for rotation about a central axis 154 thereof. A slot 156 within the planar base 146 allows the cam 12 to be received therein for engagement with the cam follower 152.

The planar base 146 of the yoke assembly 142 is pivotally coupled to a planar base 158 of the mounting member 144. A pin 160 mounted within the planar base 158 extends into a mating aperture 162 in the planar base 146 of the yoke assembly 142. Pivoting motion of the yoke assembly 142 is along a pivot axis 164 which is generally perpendicular to the central axis 154 of the cam follower 152. The mounting member 144 includes a hollow, generally cylindrical collar 166 mounted on the shuttle shaft 104 and a shell 168 of hollow, partially cylindrical configuration extending between and joining the planar base 158 to the collar 166. The hollow shell 168 accommodates the arms 148 and 150 and a portion of the cam follower 152 therein. At the same time the interior of the shell 168 is large enough to accommodate the cam follower 152 and the arms 148 and 150 during a limited useful range of pivoting motion of the yoke assembly 142 as represented by arrow 170.

In the embodiment of FIGS. 7 and 8 the counterbalancing mass 34 is driven by a castered cam follower assembly 172 which includes a yoke assembly 174 having a generally planar base 176 and a pair of opposite arms 178 and 180. The arms 178 and 180 extend outwardly from the planar base 176 in a direction away from the cam 12 to mount a cam follower 182 for rotation about a central axis 184 thereof.

The arms 178 and 180 of the yoke assembly 174 together with a portion of the cam follower 182 are received within a recess 186 in a front edge 188 of the counterbalancing mass 34. The planar base 176 bears against a relatively thin, generally planar wear plate 190. Pivoting motion of the yoke assembly 174 relative to the counterbalancing mass 34 is provided by a pin 192 mounted within the counterbalancing mass 34 and extending into a mating aperture 194 within the planar base 176 of the yoke assembly 174. This allows the yoke assembly 174 to rotate about a pivot axis 196.

As best seen in FIG. 8 the central axes 154 and 184 of the cam followers 152 and 182 lie in a common plane 198 together with the central axis 82 of the cam 12, the common plane 82 being represented by a dotted line in FIG. 8. It will also be seen from FIG. 8 that the pivot point of the yoke assembly 142 is disposed between the central axis 154 of the cam follower 152 and the cam 12. This results in the arms 148 and 150 being in tension rather than in compression as in the case of the first embodiment of FIGS. 5 and 6 with the result that the castered cam follower assembly 140 will support larger side forces perpendicular to arms 148, 150, 178 and 180 produced by angular axis misalignment, should it be present. Likewise, the pivot point of the yoke assembly 174 is disposed between the central axis 184 of the cam follower 182 and the cam 12, resulting in better operation of the castered cam follower assembly 172.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An arrangement for driving a printer shuttle comprising a mounting member coupled to the shuttle, a yoke assembly pivotally coupled to the mounting member to permit rotation of the yoke assembly relative to the mounting member about a first axis, a cam follower mounted on the yoke assembly for rotation about a second axis, and a rotatable cam disposed in engagement with the cam follower and mounted for rotation about a third axis lying in a common plane with the second axis, the first axis lying on one side of and spaced-apart from the common plane.

2. The invention set forth in claim 1, wherein the second axis is generally parallel with the third axis and is generally perpendicular to the first axis.

3. The invention set forth in claim 2, wherein the yoke assembly has a generally planar base pivotally coupled to the mounting member about the first axis and the second axis is disposed between the generally planar base and the cam.

4. The invention set forth in claim 2, wherein the yoke assembly has a generally planar base pivotally coupled to the mounting member about the first axis and the second axis is disposed on the opposite side of the generally planar base from the cam.

5. The invention set forth in claim 1, further comprising a counterbalancing mass disposed on an opposite side of the cam from the shuttle, a second yoke assembly pivotally coupled to the counterbalancing mass to permit rotation of the second yoke assembly relative to the mounting member about a fourth axis generally parallel to the first axis and a second cam follower mounted on the second yoke assembly for rotation about a fifth axis generally parallel to the second axis.

6. The invention set forth in claim 5, wherein the first-mentioned cam follower and the second cam follower are disposed on opposite sides of the cam from each other, the fifth axis generally lies within the common plane and the locations at which the first-mentioned yoke assembly is pivotally coupled to the first-mentioned base member and the second yoke assembly is pivotally coupled to the counterbalancing mass are on opposite sides of the common plane from each other.

7. An arrangement for driving a printer shuttle in reciprocating fashion comprising a mounting member coupled to the shuttle, a yoke assembly having a generally planar base pivotally coupled to the mounting member and a pair of opposite arms extending outwardly from the base, a generally cylindrical cam follower disposed between and rotatably coupled to the pair of opposite arms and a cam disposed in engagement with the cam follower, the shuttle including an elongated shaft mounted for reciprocating motion along a central axis thereof and mounting the mounting member thereon at an outer end thereof, the cam follower being rotatable about a central axis thereof lying in a common plane with the central axis of the elongated shaft, the cam being rotatable about a central axis thereof lying in the common plane and the base of the yoke assembly being pivotally coupled for rotation relative to the mounting member about an axis spaced-apart from and generally parallel to the central axis of the elongated shaft.

8. The invention set forth in claim 7, wherein the pair of opposite arms extend outwardly from the base in a direction away from the mounting member and toward the cam, and the mounting member includes a generally planar base disposed in contact with the base of the yoke assembly opposite the pair of opposite arms and a generally cylindrical collar mounted on the generally planar base and coupled to the elongated shaft of the shuttle.

9. The invention set forth in claim 7, wherein the pair of opposite arms extend outwardly from the base in a direction away from the cam and toward the mounting member, and the mounting member includes a generally planar base disposed in contact with the base of the yoke assembly adjacent the pair of opposite arms, a generally cylindrical collar coupled to the elongated shaft of the shuttle and a partially cylindrical shell extending between the collar and the base and receiving the pair of opposite arms and a portion of the cam follower therein.

10. An arrangement for driving a printer shuttle counterbalancing means in reciprocating fashion comprising a yoke assembly having a generally planar base pivotally mounted on the counterbalancing mass and a pair of opposite arms extending outwardly from the base, a generally cylindrical cam follower disposed between and rotatably coupled to the pair of opposite arms and a cam disposed in engagement with the cam follower, the cam being rotatable about a central axis thereof, the cam follower being rotatable about a central axis thereof lying generally in a common plane with and generally parallel to the central axis of the cam, and the base of the yoke assembly being pivotally mounted on the counterbalancing mass for rotation about an axis spaced-apart from and generally parallel to the common plane and generally perpendicular to the central axis of the cam follower and the central axis of the cam.

* * * * *